US007461268B2

United States Patent
Drehmel et al.

(10) Patent No.: US 7,461,268 B2
(45) Date of Patent: Dec. 2, 2008

(54) E-FUSES FOR STORING SECURITY VERSION DATA

(75) Inventors: Robert A. Drehmel, Goodhue, MN (US); William E. Hall, Clinton, CT (US); Russell D. Hoover, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 10/892,431

(22) Filed: Jul. 15, 2004

(65) Prior Publication Data

US 2006/0015754 A1    Jan. 19, 2006

(51) Int. Cl.
G06F 12/14  (2006.01)
H04L 9/32  (2006.01)
(52) U.S. Cl. ............... 713/193; 713/189; 713/194; 365/225.7
(58) Field of Classification Search .............. None
See application file for complete search history.

(56) References Cited

U.S. PATENT DOCUMENTS

| 5,081,677 | A  | * | 1/1992  | Green et al. ............ 380/281 |
| 5,497,479 | A  | * | 3/1996  | Hornbuckle ............. 463/29 |
| 5,895,962 | A  | * | 4/1999  | Zheng et al. ............ 257/529 |
| 7,177,424 | B1 | * | 2/2007  | Furuya et al. ........... 380/37 |
| 7,213,155 | B2 | * | 5/2007  | Sako et al. ............. 713/189 |
| 2005/0076225 | A1 | * | 4/2005  | Talstra et al. ........... 713/187 |
| 2005/0233724 | A1 | * | 10/2005 | Van Lammeren et al. ... 455/333 |

OTHER PUBLICATIONS

Foster et al., IBM U.S. Appl. No. 10/691,924, filed Oct. 23, 2003, "Initializing, Maintaining, Updating and Recovering Secure Operation Within an Integrated System Employing a Data Access Control Function".

* cited by examiner

*Primary Examiner*—Jung Kim
(74) *Attorney, Agent, or Firm*—Patterson & Sheridan LLP

(57) ABSTRACT

Methods and devices that may be utilized in systems to dynamically update a security version parameter used to encrypt secure data are provided. The version may be maintained in persistent storage located on a device implementing the encryption, such as a system on a chip (SOC). The persistent storage does not require battery backing and, thus, the cost and complexity associated with conventional systems utilizing battery backed storage may be reduced.

5 Claims, 7 Drawing Sheets

E-FUSES FOR STORING SECURITY VERSION DATA

CROSS-REFERENCE TO RELATED APPLICATIONS

This application contains subject matter which is related to the subject matter of the commonly owned, U.S. application Ser. No. 10/691,924 entitled "Initializing, Maintaining, Updating and Recovering Secure Operation within an Integrated System Employing a Data Access Control Function," Filed on Oct. 23, 2003, and any continuations or divisionals thereof, hereby incorporated herein by reference in its entirety.

BACKGROUND OF THE INVENTION

1. Field of the Invention

The present invention generally relates to data encryption and, more particularly, to methods and apparatus for updating parameters used for encryption, such as version control parameters.

2. Description of the Related Art

A system on a chip (SOC) generally includes one or more integrated processor cores, some type of embedded memory, such as a cache shared between the processors cores, and peripheral interfaces, such as memory control components and external bus interfaces, on a single chip to form a complete (or nearly complete) system. The use of cache memory hierarchies is well established to improve a processor performance by reducing and/or eliminating read access requests to external main memory.

As part of an enhanced security feature, some SOCs encrypt some portions of data prior to storing it in external memory. Adding such encryption to an SOC may add valuable benefits, such as preventing a hacker from obtaining instructions of a copyrighted program, such as a video game, or data that may be used to determine such instructions through reverse engineering. When the encrypted data is subsequently retrieved from external memory, it must first be decrypted before it can be used by the processor cores.

The encryption is typically carried out with the use of one or more encryption keys generated, in some way, based on a master key. Often the master key is unique to the device, in an effort to ensure no two devices perform encryption in the exact same way. In some cases, a security version parameter (hereinafter, simply the version) maintained on the system may be used in combination with the encryption, in an effort to provide some degree of flexibility regarding how and on what encryption is performed. A current version may reflect a current state of privileges a user has, in effect, determining what content the user may access. As an example, in a gaming system a user may purchase and download a new game. As part of the process of installing the new game on the system, the version may be updated and used to encrypt the game program, with the game, in encrypted form, marked as having been encrypted using the updated version. Upon loading the game, system validation logic may compare the current version of the system against the version used to encrypt the game to verify the system is authorized to run the game. If the versions match, the game will be decrypted and allowed to run, otherwise it will not.

In conventional systems, master key and version data are often stored in battery backed registers or external nonvolatile storage, such as battery-backed non-volatile random access memory (NVRAM). Unfortunately, batteries are expensive and the reliance on batteries introduces complexity as designers must deal with the possibility of having to restore values in the event battery voltage is lost. Further, storing master key and version data in external memory invites attacks by hackers attempting to gain unauthorized access. To combat this, some systems utilize tamper detection hardware designed to notify the system in the event unauthorized access is detected, which also increases system cost.

Accordingly, what is needed is a mechanism for storing Master Key and version information that does not require batteries. Preferably, such a mechanism would allow Master Key and version information to be maintained internal to a device, such as an SOC, implementing security.

SUMMARY OF THE INVENTION

The present invention generally provides methods and devices for dynamically updating security version parameters stored in persistent storage.

One embodiment provides a method of handling secure data in a secure system, wherein the secure data is passed between a processor and memory external to the processor. The method generally includes maintaining a security version parameter in persistent storage on the processor, wherein blocks of secure data are encrypted as a function of the security version parameter and dynamically changing the security version parameter by modifying the contents of the persistent storage.

Another embodiment provides a method of handling secure data in a secure system, wherein the secure data is passed between a processor and memory external to the processor. The method generally includes maintaining a security version parameter and master key data in persistent storage on the processor, encrypting a block of secure data, generating an integrity check value for the block of secure data, wherein at least one of the encrypting and the generating is performed as a function of the security version parameter, storing the encrypted block of secure data in the external memory, and dynamically changing the security version parameter by modifying the contents of the persistent storage.

Another embodiment provides a device for encrypting blocks of data to be stored in memory external to the device. The device generally includes first persistent storage elements for storing a security version parameter, second persistent storage elements for storing master key data, an encryption engine configured to encrypt secure blocks of data to be stored in the external memory, wherein at least one of: the encrypted secure blocks or an integrity check value generated therefore are affected by the security version parameter, and a mechanism for modifying the first persistent storage elements to update the security version parameter without modifying previously modified first persistent storage elements.

Another embodiment provides a method of handling secure data in a secure system, wherein the secure data is passed between a processor and memory external to the processor. The method generally includes maintaining a security version parameter and master key data in persistent storage on the processor and storing first and second copies of an encrypted data structure in external memory, wherein at least one of: the encrypted data structure or an integrity check value calculated therefor are affected by the security version parameter. The security version parameter may be updated without modifying the contents of the persistent storage. The first copy of the encrypted data structure may be overwritten with a new encrypted data structure, wherein at least one of: the encrypted data structure or an integrity check value calculated therefor are affected by the updated security version parameter. The first copy of the new encrypted data structure may be read back and validated. The persistent storage may be updated to reflect the updated security version parameter only if the first copy of the new encrypted data structure is valid.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention may be utilized in systems to dynamically update a security version parameter used to encrypt and/or validate secure data. The version may be maintained in persistent storage located on a device implementing the encryption, such as a system on a chip (SOC). The persistent storage does not require battery backing and, thus, the cost and complexity associated with conventional systems utilizing battery backed storage may be reduced. Further, by utilizing persistent storage that does not allow previously written storage elements to be re-written (erased) an additional level of security may be achieved, by avoiding inadvertent or intentional (e.g., initiated by a hacker) rollback of versions.

As used herein, the term security metadata generally refers to any type of data used during any part of the encryption process. For example, security metadata may include such data as encryption keys, version numbers, and the like, used to encrypt and/or validate data. As used herein, the term secure data refers to data that is to be encrypted when stored external to an encryption-enabled device, such as an SOC, while the term non-secure data refers to data that may be stored externally in non-encrypted form. Data that is non-encrypted (whether secure or non-secure) is referred to herein as plaintext while data that is encrypted is referred to herein as ciphertext. These terms are used for convenience and do not imply the encrypted or non-encrypted data is actually textual data.

In the following, reference is made to embodiments of the invention. It should be understood, however, that the invention is not limited to any specific embodiments described herein. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether a particular advantage is achieved by a given embodiment is not limiting of the invention. Thus, the following aspects, features, embodiments and advantages are merely illustrative and, unless explicitly present, are not considered elements or limitations of the appended claims.

An Exemplary System

Figure 1:
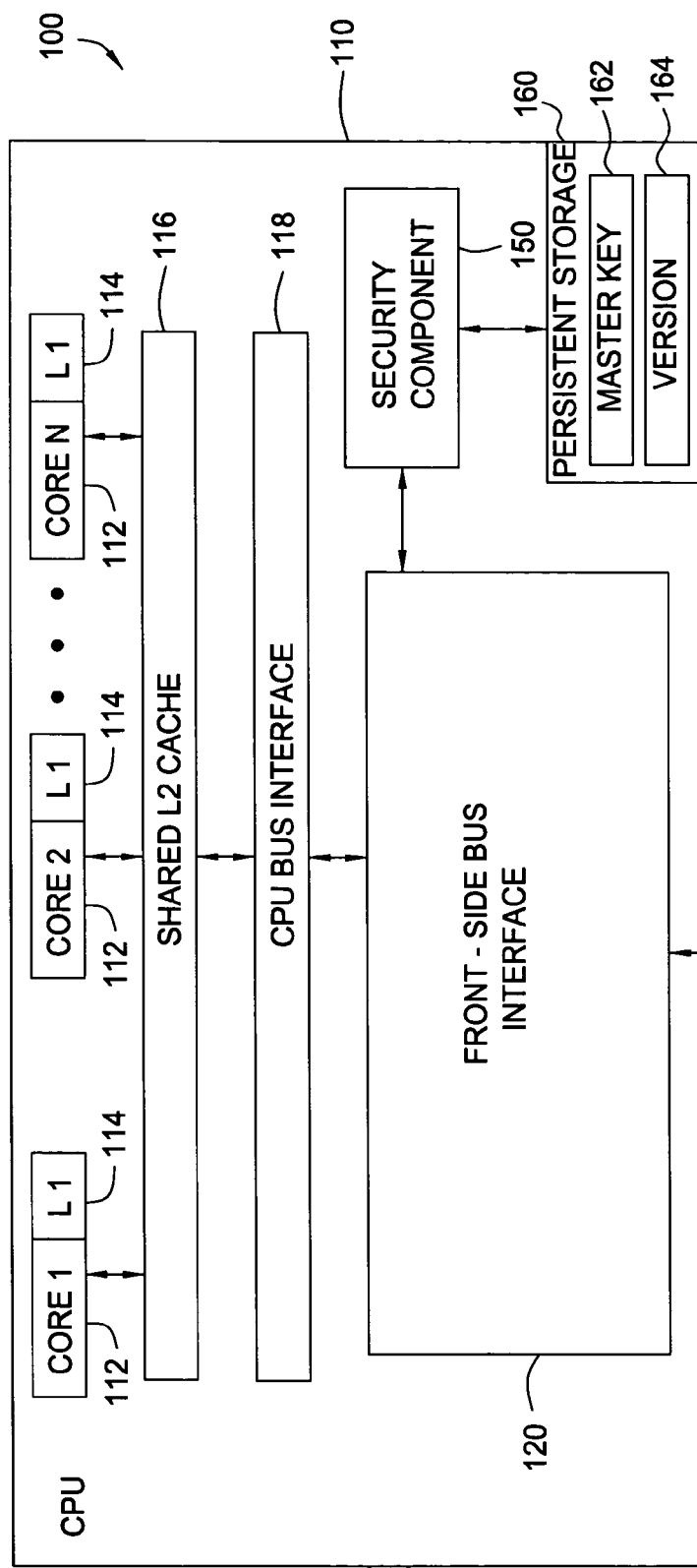
FIG. 1 illustrates an exemplary system including a CPU, in which embodiments of the present invention may be utilized.
Figure 1:
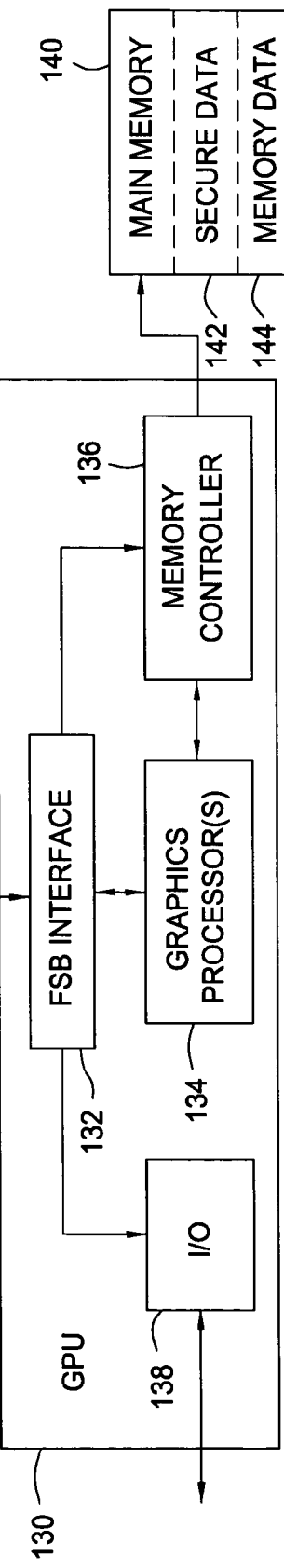

Referring now to FIG. 1, an exemplary computer system 100 including a central processing unit (CPU) 110 is illustrated, in which embodiments of the present invention may be utilized. As illustrated, the CPU 110 may include one or more processor cores 112, which may each include any number of different type functional units including, but not limited to arithmetic logic units (ALUs), floating point units (FPUs), and single instruction multiple data (SIMD) units. Examples of CPUs utilizing multiple processor cores include the PowerPC® line of CPUs, available from International Business Machines (IBM) of Armonk, N.Y.

As illustrated, each processor core 112 may have access to its own primary (L1) cache 114, as well as a larger shared secondary (L2) cache 116. In general, copies of data utilized by the processor cores 112 may be stored locally in the L2 cache 116, preventing or reducing the number of relatively slower accesses to external main memory 140. Similarly, data utilized often by a processor core 112 may be stored in its L1 cache 114, preventing or reducing the number of relatively slower accesses to the L2 cache 116.

The CPU 110 may communicate with external devices, such as a graphics processing unit (GPU) 130 and/or a memory controller 136 via a system or frontside bus (FSB) 128. The CPU 110 may include an FSB interface 120 to pass data between the external devices and the processing cores 112 (through the L2 cache) via the FSB 128. An FSB interface 132 on the GPU 130 may have similar components as the FSB interface 120, configured to exchange data with one or more graphics processors 134, input output (I/O) unit 138, and the memory controller 136 (illustratively shown as integrated with the GPU 130).

The FSB interface 120 may include any suitable components, such as a physical layer (not shown) for implementing the hardware protocol necessary for receiving and sending data over the FSB 128. Such a physical layer may exchange data with an intermediate "link" layer which may format data received from or to be sent to a transaction layer. The transaction layer may exchange data with the processor cores 112 via a core bus interface (CBI) 118.

Secure Data Processing

As part of an enhanced security feature, the CPU 110 may encrypt some portions of data, referred to herein as secure data, prior to storing it in main memory 140 (such encrypted portions of data are illustratively shown as secure data 142 in main memory 140). Accordingly, the CPU 110 may include a security component 150 used to encrypt secure data prior to transmission over the FSB 128 by the FSB interface 120.

Upon later retrieval of the encrypted data, the security component 150 may also be used to decrypt the encrypted secure data prior to passing it into the L2 cache 116 for use by one or more of the processor cores 112.

The security component 150 may employ any suitable encryption algorithms or combination of algorithms for encryption/decryption, including, but not limited to algorithms utilizing whitening keys, hash keys, and/or Advanced Encryption Standard (AES) keys. For some embodiments, one or more of these keys may be generated based on a master key 162 stored in persistent storage 160 located on the CPU 110. For other embodiments, the master key 162 may be used to protect these keys, for example, by encrypting a data structure containing the keys or used to generate the keys. As will be described in greater detail below, encryption may also utilize a security version parameter (version 164) also stored in persistent storage 160. In some cases, information regarding the key(s), as well as the version 164 used for encryption, and/or validation of encrypted data, may be encrypted and stored externally, as a secure block of data, shown as security metadata 144. As will be described in greater detail below, upon retrieval of secure data 141, this metadata 144 may be retrieved for validation and/or decryption purposes.

As shown in the Figures described below, for some embodiments, the version 164 may actually be used to encrypt data (e.g., as an input to an encryption algorithm implemented in hardware or software). However, for other embodiments, the version 164 may be used to generate an integrity check value (a checksum or hash value) on a block of encrypted data. In either case, the encrypted data may be validated against a current version. For example, if the data was encrypted using a different version, the decrypted data would not validate. Similarly, an integrity check value for the encrypted data were generated with a different version would not match an integrity check value generated with the current version.

Figure 2A:
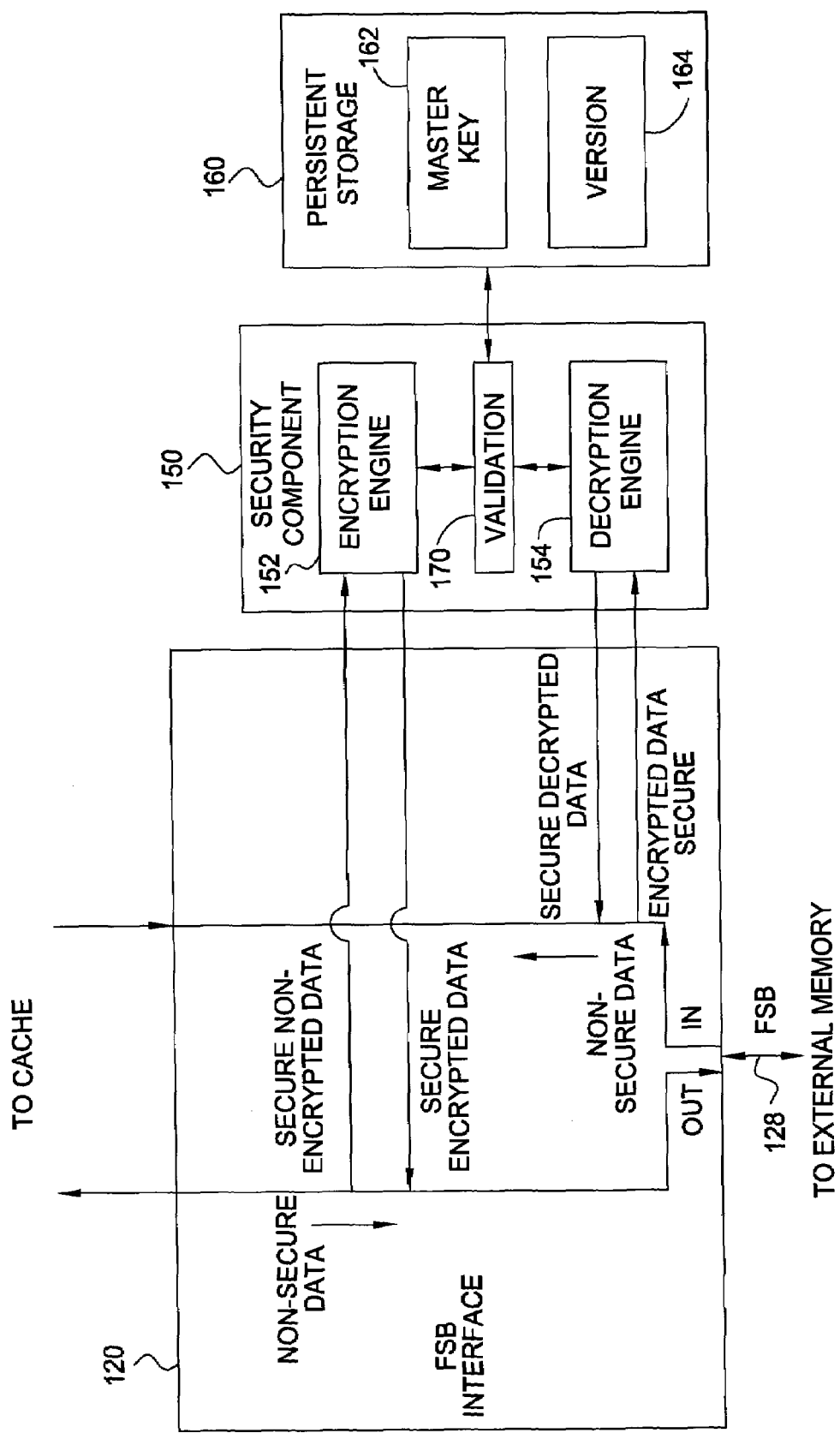
FIGS. 2A-2B are block diagrams illustrating data flow through the CPU, according to one embodiment of the present invention.

FIG. 2A is a block diagram that illustrates the flow of both secure and non-secure data through the CPU, in accordance with one embodiment of the present invention, for example, as data is read into the cache from main memory and written out from the cache to main memory. Such data flow may take place, for example, when loading instructions and/or data of a program, such as a game program, into the CPU 110 for execution. While not shown, flow control logic configured to identify and route secure and non-secure data in accordance with FIG. 2A may be included in the FSB interface 120.

Note that data received from cache will typically be unencrypted (plaintext) regardless of whether the data is secure or non-secure. If the data is not secure, the plaintext data is written directly out to external memory. Any suitable technique may be utilized to determine if the data is secure. As an example, a specific address range may be reserved for secure data. As another example, secure data may be identified by one or more bit settings in a page table entry, for example, indicating a corresponding cache line is secure. In any case, if the data is secure, the plaintext data is routed to an encryption engine 152 of the security component 150 for encryption. The encryption engine 152 encrypts the secure data and returns the secure data encrypted (as ciphertext). For some embodiments, an integrity check value (ICV) may be calculated based on the secure data in plaintext and/or ciphertext form, to allow for subsequent authentication to ensure the encrypted data was not modified (tampered with). Depending on the embodiment, this integrity check value may also be stored externally, as metadata 144, or internally.

Figure 2B:
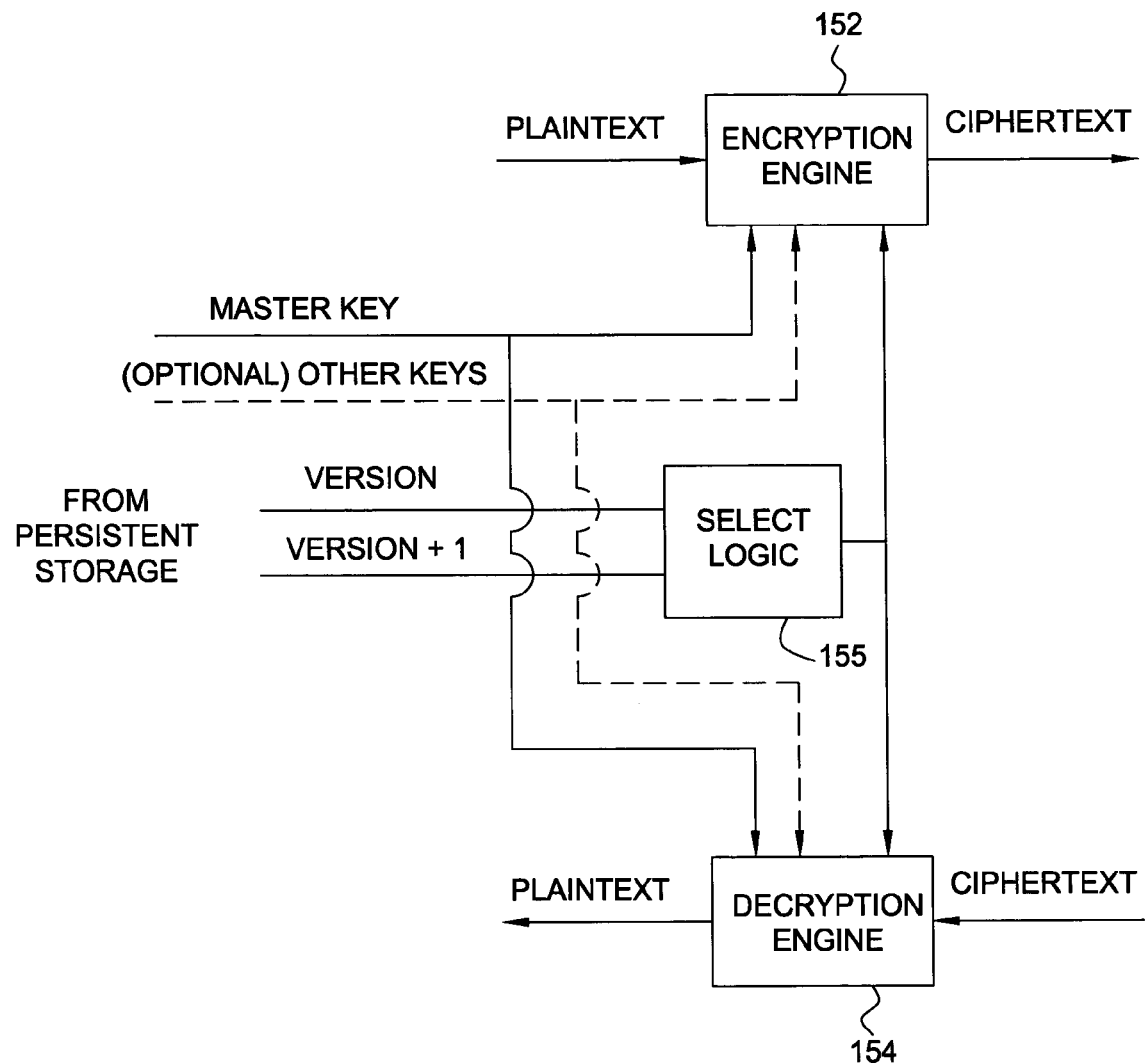

As illustrated in FIG. 2B, the encryption engine 152 may encrypt the plaintext data using the master key 162 (and/or other keys) and version 164 stored in persistent storage 160. Accordingly, a change in version 164 results in different encryption (e.g., different ciphertext given the same plaintext), thus providing a convenient mechanism to vary the encryption. As illustrated, the decryption engine 154 may also use the master key 162 (and/or other keys) and version 164 to decrypt ciphertext data retrieved from external memory. As will be described in greater detail below, for some embodiments, in an effort to ensure a secure transition to a dynamically updated security version, the encryption engine may perform encryption and decryption using the updated security version (shown as VERSION +1), prior to actually storing the updated security version in persistent storage 160. Select logic 155 may allow the encryption and decryption engines to select the proper version.

As illustrated, data retrieved from external memory that is not secure is forwarded on to the cache, as no decryption is required. If the data is secure, however, the data is ciphertext and, therefore, is routed to a decryption engine 154 of the security component 150 for decryption. In some cases, information regarding the keys and version data used for encryption (metadata 144) may also be retrieved with the secure data. As will be described in further detail below, for some embodiments, a validation component 170 may be configured to compare the version data retrieved with the current version 164 in persistent storage 160 to ensure the current system is authorized to access the secure data.

While some embodiments may use encryption/decryption engines implemented in hardware, for some embodiments some or all of the encryption and/or validation operations described herein and shown in the Figures may be performed in software (e.g., running in a secure environment). In such embodiments, software may have direct access (via the CPU) to the master key and/or version information stored in persistent storage, instead of or in addition to the hardware security component. Accordingly, the concepts described herein related to storing version information in persistent storage may be used to advantage in systems utilizing hardware encryption, software encryption, or any combination thereof.

Storing Version Information in Persistent Storage

In any case, the current version 164 in persistent storage 160 of the system may be updated periodically, for example, to reflect a user's current set of security privileges that may determine what secure data that user is authorized to access. In order to accommodate these changes, the persistent storage 160 should be some type of storage that allows writing. For some embodiments, however, to prevent inadvertent or unauthorized rollback of versions used for encryption, the persistent storage 160 should be such that, once storage elements thereof are programmed, they may not be subsequently modified. In other words, the persistent storage 160 may be configured to provide monotonic updates in one direction with time, such as a version value that may only be increased.

Figure 3A:
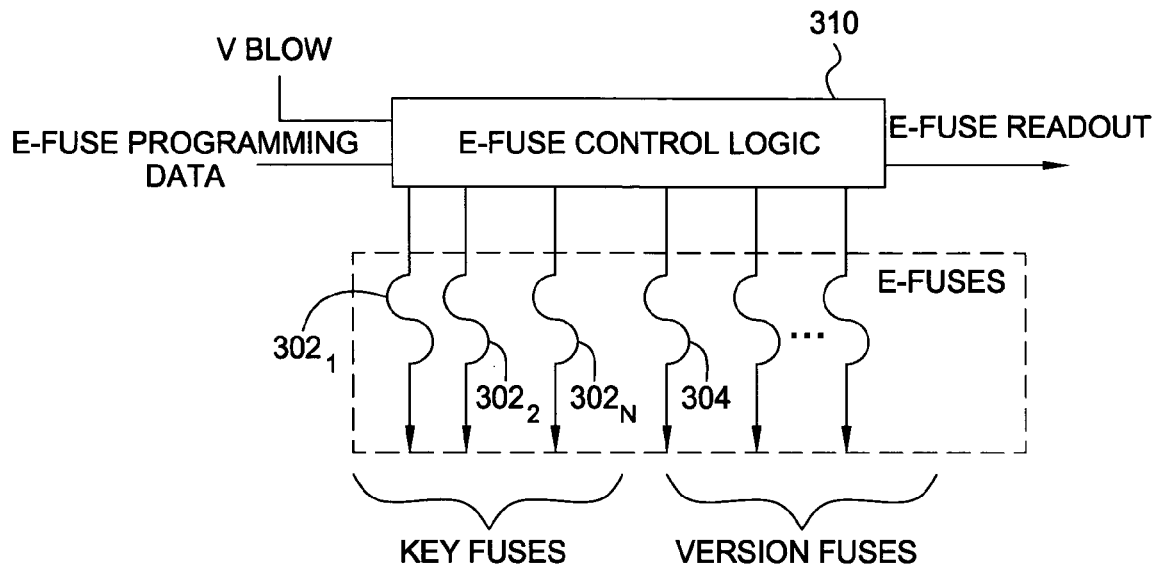
FIGS. 3A and 3B illustrate different configurations of persistent storage, according to exemplary embodiments of the present invention.

One example, of a suitable type of storage is electrically programmable fuses, commonly referred to as e-Fuses. As illustrated in FIG. 3A, for some embodiments, a first set of e-Fuses $302_1 \ldots 302_N$ may be used to store master key information, while a second set of e-Fuses $304_1 \ldots 304_M$ may be used to store version information. As illustrated, fuse control logic 310 may be included In such embodiments, to blow the e-Fuses 302-304 by applying a high blow voltage ($V_{BLOW}$) to fuses, as indicated by e-Fuse programming data (which may be a simple bit string indicating which fuses are to be blown). The fuse control logic 310 may also be used to readout the state of the fuses 302-304 which may subsequently be latched into registers accessible by the security component 150.

For some embodiments, in order to update the version, the next available e-Fuse 304 may be blown. Accordingly, arbitrarily assuming fuses are blown from left to right, the rightmost fuse may be indicative of the current version. For many applications, it may not be critical that the next e-Fuse 304 in sequence be blown, but may be sufficient that the version is changed to a new value (which will result in different encryption). In such embodiments, the fuse control logic 310 may be configured to monitor the state of any e-Fuse 304 being blown and, if the e-Fuse 304 does not blow (e.g., within a given period of time), the next fuse may be blown instead. While this may have the effect of skipping some versions (e.g., if fuse $304_{100}$ will not blow but $304_{101}$ will, "version 100" may be skipped).

Figure 3B:
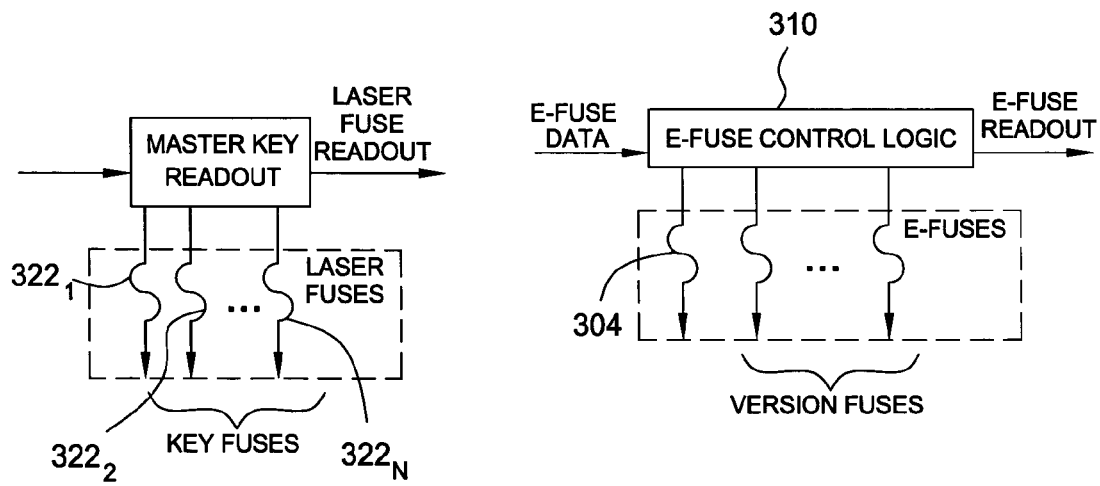

For some embodiments, version and master key information may be stored in different types of persistent storage. For example, for some embodiments, the master key information might not be changed during the life of the product, master key information may be stored in laser fuses $322_1$-$322_N$ rather than e-Fuses, as illustrated in FIG. 3B. The laser fuses $322_1$-$322_N$ may be blown during a manufacturing process, while the device containing them is still in wafer form, which may be convenient for system (e.g., game box, PC, etc.) manufacturers. As a result, however, the device (e.g., CPU) manufactures would have to be provided with the master key data which may create opportunities for the master key values to be mishandled, which may compromise security. Therefore, for highly sensitive applications, one advantage to storing the master key in e-fuses (or some other type of electrically writable persistent storage) is that system manufactures incorporating the devices in their products may be able to set the master keys themselves.

Other types of suitable persistent storage may include electrically erasable programmable read-only memory (EEPROM) or flash memory. For some embodiments, systems utilizing EEPROM or flash memories may include control circuitry to ensure that previously written storage elements (memory cells) cannot be modified, while still allowing subsequent storage elements to be programmed. For example, such control circuitry may be configured to permanently disable writing to all addresses below an address currently being written.

Initializing Version and Master Key Information

Figure 4:
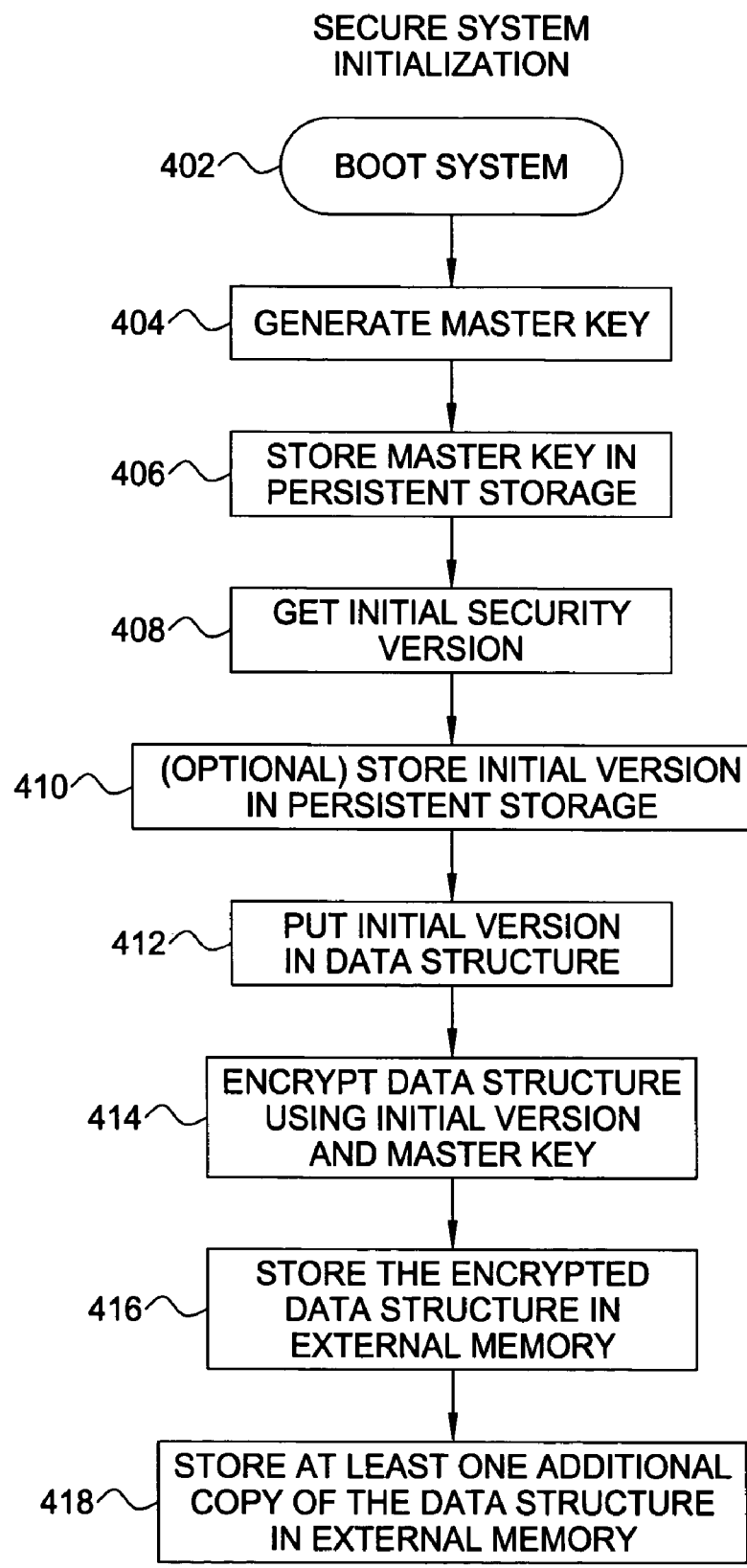
FIG. 4 is a flow diagram of exemplary operations for initializing secure operations utilizing master key and version data in persistent storage according to one embodiment of the present invention.

FIG. 4 is a flow diagram of exemplary operations for initializing master key and version data, according to one embodiment of the present invention. For illustrative purposes, the operations 400 assume that the master key information is stored in some type of persistent storage that is writable at run time.

The operations 400 begin, at step 402, by booting the system. As described in the commonly assigned, co-pending U.S. application Ser. No. 10/691,924 entitled "Initializing, Maintaining, Updating and Recovering Secure Operation within an Integrated System Employing a Data Access Control Function," Filed on Oct. 23, 2003, hereby incorporated herein by reference in its entirety, the first time the system is booted, it may do so in a non-secure mode. In preparation of entering a secure mode, at step 404, a master key is generated, for example, based on a hardware random number generator (not shown). At step 406, the master key is stored in persistent storage.

At step 408, an initial security version is obtained. For some embodiments, the initial security version may simply be the initial state of the persistent storage, such as the initial (e.g., un-blown or partially blown) state of eFuses. For other embodiments, the initial security may be predetermined, for example, to reflect a current version of a product. In such cases, the predetermined security version may be stored in persistent storage, at step 410.

With the master key and version in place, the device may enter a secure mode, whereby secure data is encrypted using the master key and current version. For example, the master key and security version may be used to encrypt data structures to be stored in external memory, such as a data structure containing security key sets. As previously described, the security version may be stored and encrypted with the data, to allow later comparison against the current security version when retrieving the encrypted data structure. Accordingly, at step 412, the initial security version is put in a data structure to be encrypted and, at step 414, the data structure is encrypted using the initial security version and master key information. At step 416, the encrypted data structure is stored in external (e.g., FLASH) memory.

At step 418, at least one additional copy of the encrypted data structure is stored in external memory. For some embodiments, maintaining more than one copy of the encrypted data structure may ensure at least one good copy of the encrypted data is available even if one or more other copies become invalid for some reason, such as tampering or some type of writing error, which may allow data to be recovered in the occurrence of some such event. Maintaining multiple copies may also allow recovery in the event that updates to the encrypted data structure (e.g., to grant/revoke privileges as described below), which may involve relatively lengthy operations, are interrupted for any reason, such as an unexpected loss of power. For example, by maintaining multiple copies, even if one copy becomes corrupted, if the other copy is good it may be used to restore the corrupted copy.

Utilizing Version Information for Secure Validation at Runtime

Figure 5:
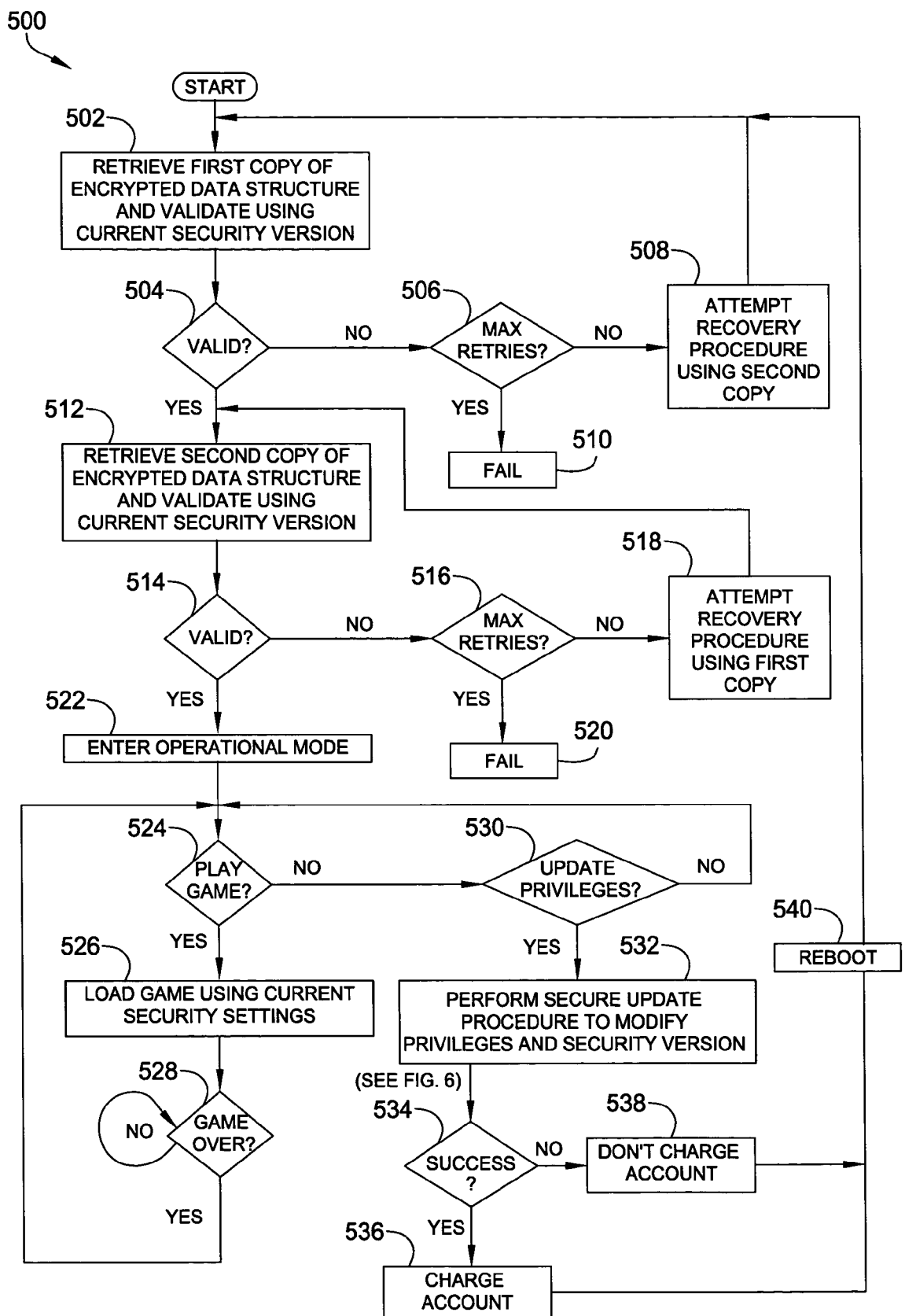
FIG. 5 is a flow diagram of exemplary operations for secure runtime operations utilizing master key and version data in persistent storage according to one embodiment of the present invention.

FIG. 5 is a flow diagram of exemplary operations 500 for secure runtime operations utilizing version information, according to one embodiment of the present invention. The operations 500 assume that multiple copies (illustratively, two) of an encrypted secure data structure have been stored in external memory, for example, as shown in the operations 400 described above. Further, for illustrative purposes, the operations 500 are assumed to be performed in a game system. However, one skilled in the art will recognize that similar operations may be performed to provide secure operations in a wide variety of different type systems.

The operations 500 begin, at step 502, by retrieving a first copy of the encrypted data structure and validating the secure data structure using a current security version. As previously described, the validation may involve generating an integrity check value for the retrieved data structure using the current security version or decrypting the retrieved data structure using the current security version. In any case, if the first copy of the data structure is valid, as determined at step 504, the second copy of the data structure is retrieved and validated, at step 512. If the second copy of the data structure is also valid, as determined at step 514, redundancy is maintained and an operations mode is entered, at step 522.

If either of the copies of the data structure are not valid, recovery procedures may be attempted in an effort to maintain redundancy. For example, if the first copy is not valid, a recovery procedure may be attempted, at step 508, wherein the first copy is overwritten with the second copy, after which the operations may return to step 502, to determine if the recovery procedure was successful in restoring the first copy. Alternatively, if the second copy is not valid, a recovery procedure may be attempted, at step 518, wherein the second copy is overwritten with the first copy, after which the operations may return to step 512 to determine if the recovery procedure was successful in restoring the second copy. For some embodiments, because invalid copies may be the result of unrecoverable problems (e.g., irreparable portions of external memory) there may be a maximum allowable number of retries that, if exceeded (as determined at steps 506 and 516), may result in failures (steps 510 and 520), for example, not allowing the system to enter into an operational mode.

Assuming the operational mode is reached, at step 522, a loop of operations (524-536) is entered, in which one of two basic operations is performed: a game is played or privileges are updated. If a game is to be played, as determined at step 524, the game is loaded using current security and privilege settings, at step 526. Once the game is over, as determined at step 528, the loop of operations is entered again.

In some cases, a user may choose to update privileges, for example, to gain some new type of desired functionality. For example, a user may initially receive a first set of privileges when purchasing a game system. This first set of privileges may authorize the user to play a first set of games supplied with the system. The privileges may be stored (in external memory) in the data structure encrypted using a security version setting that shipped with the game system. To play any additional games may require additional privileges, which may be requested by a user, for example, via an online purchase.

If privileges are to be updated, as determined at step 530, an update procedure to securely modify the privilege information and security version is performed, at step 532. If the update procedure is successful, the user's account is charged, at step 536 and the system is rebooted, at step 540, to reflect the update privilege information. On the other hand, if the update procedure is not successful, the user's account is not charged, at step 538. However, the system may still be rebooted, for example, in an effort restore one of the copies of the secure data structure which (as will be described in greater detail below) may have been corrupted during the failed update procedure.

Utilizing Version Information for Secure Runtime Operation

Figure 6:
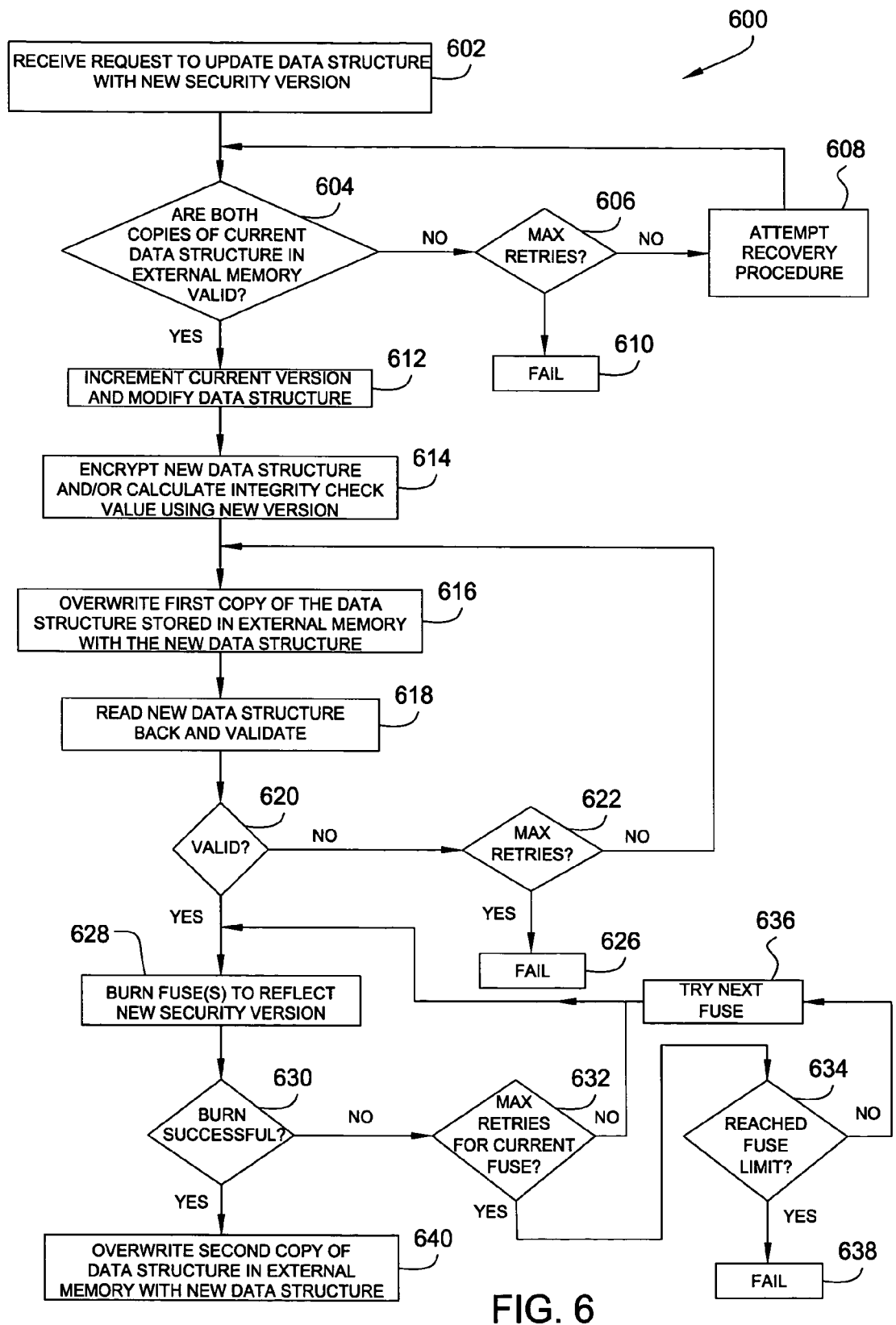
FIG. 6 is a flow diagram of exemplary operations for secure updating of version data in persistent storage according to one embodiment of the present invention.

FIG. 6 illustrates exemplary operations 600 for an update procedure to modify the secure data structure (e.g., to reflect a change in privileges) and update a security version. It should be noted, however, that not all types of privilege updates may require modifying the security version. For example, if certain privileges are not to be revoked, and the user is paying for the updates, privilege information may be updated in the secure data structure without modifying the security version used to encrypt the data structure. On the other hand, if some privileges are being revoked, it may be desirable to modify the security version to prevent the user from "rolling back" the system to regain the privileges revoked, for example, by replacing the secure data block with a previous copy.

The operations 600 begin, at step 602, by receiving a request to update the security structure with a new security version. At step 604, a test is performed to determine if both copies of the data structure stored in external memory are valid (e.g., by decrypting and/or generating an integrity check value using the current security version). If both copies of the current data structure are not valid, a recovery procedure may be attempted, at step 608. As previously described, a recovery procedure may involve overwriting an invalid copy of the data structure with a valid copy. The validation operations of step 604 may then be repeated. In some cases, if a maximum number of retries is exceeded, as determined at step 606, a failure may be reported, at step 610.

However, if both copies of the current data structure are valid, the data structure is modified (e.g., to reflect a change in privileges) and the current security version is incremented, at step 612. At step 614, the new data structure is encrypted (and/or an integrity check value is generated) using the new security version. In an effort to always maintain at least one valid copy of the data structure, only one copy of the data structures in external memory may be overwritten until the security version is successfully updated in persistent storage, possibly allowing recovery in the event of a failure in writing the new data structure to external memory or in writing the new security information to persistent storage.

Therefore, at step 616, the first copy of the data structure in external memory is overwritten with the new data structure. At step 618, the new data structure is read back from external memory and validated. If the copy read back is not valid, indicating a possible write failure, the operations 616-620 may be repeated, up to a maximum number of retries, after which a failure may be reported, at step 626 (e.g., resulting in the user not being charged for updates, per step 538 of FIG. 5).

If the data structure read back is valid, the persistent storage is modified to reflect the incremented security version, for example, by burning one or more fuses, at step 628. In some cases, updates to the persistent storage may not be successful, for example, due to faulty storage elements (e.g., fuses that will not burn). Accordingly, a test may be performed to determine if the update to persistent storage is successful, for example, by performing a read back of fuses, at step 630. If a fuse did not burn successfully, attempts to burn the fuse may be repeated, up until a maximum number of retries for that fuse. For some embodiments, the particular fuse burned may not be matter, for example if a security version is reflected by a total number of fuses burned. Therefore, provided the fuse limit has not been reached (no more fuses to blow), as determined at step 634, the blow operations may be repeated with a different (e.g., the next) fuse selected, at step 636. If the fuse limit has been reached, a failure may be reported, at step 628.

If the fuse burning is successful, the second copy of the data structure in external memory is overwritten with the new data structure, at step 640, and secure update procedure is complete. Of course, for some embodiments, the second copy of the data structure may be read back and validated. Recall, however (referring back to FIG. 5), that after updating the data structure, the system may be rebooted (step 540) causing the first and second copies of the data structure to be validated (at steps 502 and 512, respectively).

CONCLUSION

Storing security versions in persistent, but changeable, storage, such as electronically programmable fused (e-Fuses), may allow such version information to be stored securely while still providing the flexibility to change the versions while the system is running. Changing the version information while the system is running may allow privileges to be granted and/or revoked dynamically. For some embodiments, data structures containing the privilege information may be encrypted and validated using security version information.

While the foregoing is directed to embodiments of the present invention, other and further embodiments of the invention may be devised without departing from the basic scope thereof, and the scope thereof is determined by the claims that follow.

What is claimed is:

1. A method of handling secure data in a secure system, wherein the secure data is passed between a processor and memory external to the processor, comprising:

maintaining a security version parameter and master key data in persistent storage on the processor;

storing first and second copies of an encrypted data structure in external memory, wherein at least one of: the encrypted data structure or an integrity check value calculated therefor are affected by the security version parameter;

dynamically updating the security version parameter without modifying the contents of the persistent storage;

overwriting the first copy of the encrypted data structure with a new encrypted data structure, wherein at least one of: the encrypted data structure or an integrity check value calculated therefor are affected by the updated security version parameter;

reading back the first copy of the new encrypted data structure;

determining if the first copy of the new encrypted data structure read back is valid; and modifying the persistent storage to reflect the updated security version parameter only if the first copy of the new encrypted data structure is valid.

2. The method of claim 1, further comprising:

overwriting the second copy of the data structure with the new encrypted data structure.

3. The method of claim 1, further comprising:

determining if the first and second copies of the encrypted data structure are valid prior to overwriting the first copy of the encrypted data structure with the new encrypted data structure.

4. The method of claim 1, wherein modifying the persistent storage to reflect the updated security version parameter comprises burning a fuse.

5. The method of claim 4, wherein the security version parameter is determined by the total number of fuses burnt.

* * * * *